US011511720B2

(12) United States Patent
Seol

(10) Patent No.: US 11,511,720 B2
(45) Date of Patent: Nov. 29, 2022

(54) APPARATUS AND METHOD FOR PERFORMING REAR-WHEEL REGENERATIVE BRAKING CONTROL OF ESC INTEGRATED REGENERATIVE BRAKING SYSTEM

(71) Applicant: HYUNDAI MOBIS CO., LTD., Seoul (KR)

(72) Inventor: Yong Cheol Seol, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 302 days.

(21) Appl. No.: 16/865,788

(22) Filed: May 4, 2020

(65) Prior Publication Data

US 2020/0353910 A1 Nov. 12, 2020

(30) Foreign Application Priority Data

May 10, 2019 (KR) .................. 10-2019-0054667

(51) Int. Cl.
*B60T 13/68* (2006.01)
*B60T 7/06* (2006.01)
(Continued)

(52) U.S. Cl.
CPC .............. *B60T 13/686* (2013.01); *B60T 7/06* (2013.01); *B60T 8/171* (2013.01); *B60T 11/34* (2013.01);
(Continued)

(58) Field of Classification Search
CPC .... B60T 13/686; B60T 7/06; B60T 2270/608; B60T 8/171; B60T 11/34; B60T 13/142
See application file for complete search history.

(56) References Cited

U.S. PATENT DOCUMENTS

| 10,076,961 B2 * | 9/2018 | Seol | .......................... B60T 1/10 |
| 10,974,602 B2 * | 4/2021 | Kim | ...................... B60T 13/745 |
| 2021/0053544 A1 * | 2/2021 | Seol | ...................... B60T 17/221 |

FOREIGN PATENT DOCUMENTS

| KR | 1020160028043 A | * | 3/2016 |
| KR | 10-2019-0016200 A | | 2/2019 |

OTHER PUBLICATIONS

Translation of Korean Patent No. 1020160028043 from website: https://worldwide.espacenet.com obtained on Apr. 27, 2022.*

(Continued)

*Primary Examiner* — Pamela Rodriguez
(74) *Attorney, Agent, or Firm* — NovoTechIP International PLLC

(57) ABSTRACT

Provided are an apparatus and method for performing rear-wheel regenerative braking control of an ESC integrated regenerative braking system. The apparatus includes: a pedal cylinder unit connected with a reserve unit in which oil is stored and configured to generate an oil pressure as a brake pedal is pressed; a motor driven by an electric signal that is output in response to displacement of the brake pedal; a master cylinder unit connected with the pedal cylinder unit; a control unit configured to perform reverse pressure control on the motor as much as a variation in a rear-wheel regenerative braking force if transition of the rear-wheel regenerative braking force occurs, and perform drive pressure control on the motor if the transition of the rear-wheel regenerative braking force is completed; and oil pressure relief valves provided on oil pressure lines that connect from the reserve unit to wheel cylinders.

11 Claims, 3 Drawing Sheets

(51) Int. Cl.
*B60T 8/171* (2006.01)
*B60T 11/34* (2006.01)
*B60T 13/14* (2006.01)

(52) U.S. Cl.
CPC ....... *B60T 13/142* (2013.01); *B60T 2270/608* (2013.01)

(56) References Cited

OTHER PUBLICATIONS

Translation of Korean Patent No. 1020190016200 from website: https://worldwide.espacenet.com obtained on Apr. 27, 2022.*

* cited by examiner

APPARATUS AND METHOD FOR PERFORMING REAR-WHEEL REGENERATIVE BRAKING CONTROL OF ESC INTEGRATED REGENERATIVE BRAKING SYSTEM

CROSS-REFERENCE TO RELATED APPLICATION

This application claims priority from and the benefit of Korean Patent Application No. 10-2019-0054667, filed on May 10, 2019, which is hereby incorporated by reference for all purposes as if set forth herein.

BACKGROUND

Field

Exemplary embodiments of the present disclosure relate to an apparatus and method for performing rear-wheel regenerative braking control of an electronic stability control (ESC) integrated regenerative braking system, and more particularly, to an apparatus and method for performing rear-wheel regenerative braking control of an ESC integrated regenerative braking system capable of linearly generating a hydraulic pressure at the time of regenerative braking coordinated control in the ESC integrated regenerative braking system.

Discussion of the Background

A regenerative braking system refers to a system that drives a generator to generate electric energy when there is surplus power with which a vehicle can be driven by inertia. This regenerative braking system is generally operated as one system interlocked with a brake.

It is a brake that plays the most important role in the regenerative braking system. Energy is regenerated while regenerative braking in which a motor is operated as a generator is realized, but because there is a limit in realizing a braking force which a driver wants with only a regenerative brake, an ESC integrated regenerative braking system is developed, which makes good use of an integrated brake controller, which shows a braking force along with a hydraulic brake, and an oil pressure supply unit. As one example, the ESC integrated regenerative braking system performs regenerative braking coordinated control on the basis of four wheels.

Meanwhile, there occurs a situation where the regenerative braking coordinated control should be performed with only rear wheels as a rear-wheel drive EV is developed. Thus, the ESC integrated regenerative braking system is configured in an H-split form, and a split valve is used. In this case, the split valve should be designed to increase a spring force to be higher than or equal to a fixed pressure in order to prepare for a circuit failure. If a regenerative braking force occurs at the rear wheels at the time of putting a brake on the rear wheels in the system having this configuration, a hydraulic pressure is first generated at only front wheels, and is generated at the rear wheels in proportion to a decrease in the regenerative braking force to meet a braking force desired by a driver.

However, the conventional ESC integrated regenerative braking system has a problem in that, at the time of rear-wheel regenerative braking, since the spring force of the split valve is high, the hydraulic pressure is not linearly generated as much as the regenerative braking force is linearly changed, and thus the braking force is non-uniform.

Thus, there is a need for development of technology capable of linearly generating the hydraulic pressure at the time of the regenerative braking coordinated control in the ESC integrated regenerative braking system.

The background of the present disclosure is disclosed in Korean Unexamined Patent Application Publication No. 2019-0016200 (published on Feb. 18, 2019, and entitled "ELECTRIC BRAKE SYSTEM AND CONTROL METHOD THEREOF").

SUMMARY

Various embodiments are made to improve the above problems, and are directed to an apparatus and method for performing rear-wheel regenerative braking control in an ESC integrated regenerative braking system capable of linearly generating a hydraulic pressure at the time of regenerative braking coordinated control in the ESC integrated regenerative braking system.

The problem to be solved by the present disclosure is not limited to the above-mentioned problem(s), and other problem(s) that are not mentioned can be clearly understood by those skilled in the art from the following description.

An apparatus for performing rear-wheel regenerative braking control of an ESC integrated regenerative braking system according to an aspect of the present disclosure includes: a pedal cylinder unit connected with a reserve unit in which oil is stored and configured to generate an oil pressure as a brake pedal is pressed; a motor driven by an electric signal that is output in response to displacement of the brake pedal; a master cylinder unit connected with the pedal cylinder unit and configured to generate a braking oil pressure through a master piston that is moved forward or backward by the driving of the motor; a control unit configured to, in a state in which a vehicle is in a regenerative braking coordinated control mode, perform front-wheel pressure control on the motor according to a pressure desired by a driver based on the brake pedal in a case where a rear-wheel regenerative braking force occurs, perform reverse pressure control on the motor as much as a variation in the rear-wheel regenerative braking force in a case where transition of the rear-wheel regenerative braking force occurs, and perform drive pressure control on the motor in a case where the transition of the rear-wheel regenerative braking force is completed; and oil pressure relief valves provided on oil pressure lines that connect from the reserve unit to wheel cylinders that brake wheels (RR, RL, FR, FL) and opened or closed under the control of the control unit.

In the present disclosure, the oil pressure relief valves may include: a first oil pressure relief valve that adjusts an oil pressure of an oil pressure channel connecting between the reserve unit and a first chamber of the pedal cylinder unit; a second oil pressure relief valve that adjusts an oil pressure of an oil pressure channel connecting between the first chamber of the pedal cylinder unit and a third chamber of the master cylinder unit; a third oil pressure relief valve that adjusts an oil pressure of an oil pressure channel connecting between a second chamber of the pedal cylinder unit and a fourth chamber of the master cylinder unit; a fourth oil pressure relief valve that adjusts an oil pressure of an oil pressure channel connecting between the reserve unit and the fourth chamber of the master cylinder unit; a fifth oil pressure relief valve that adjusts an oil pressure of an oil pressure channel connecting between the third chamber of the master cylinder unit and the wheel cylinders; a sixth oil pressure relief valve that adjusts an oil pressure of an oil pressure channel connecting between the fourth chamber of the master cylinder unit and the wheel cylinders; and a seventh oil pressure relief valve that adjusts an oil pressure of an oil pressure channel connecting between the fifth oil pressure relief valve and the sixth oil pressure relief valve.

In the present disclosure, the control unit may close the seventh oil pressure relief valve in the case where the rear-wheel regenerative braking force occurs, open the first oil pressure relief valve and the third oil pressure relief valve, and then rotate the motor forward or backward to increase or decrease pressures of the front wheels.

In the present disclosure, the control unit may detect a regenerative braking amount through a first pressure sensor provided adjacent to the front wheels, and perform front-wheel pressure control on the motor on the basis of a result of the detection.

In the present disclosure, the control unit may close the seventh oil pressure relief valve and the fifth oil pressure relief valve to maintain a front-wheel oil pressure in the case where the transition of the rear-wheel regenerative braking force occurs, close the second oil pressure relief valve, perform the reverse pressure control on the motor as much as the variation in the rear-wheel regenerative braking force, and linearly generate a rear-wheel pressure.

In the present disclosure, the control unit may detect a regenerative braking amount through a second pressure sensor provided adjacent to the rear wheels, and perform the reverse pressure control on the motor on the basis of a result of the detection.

In the present disclosure, the control unit may close the sixth oil pressure relief valve, opens the second oil pressure relief valve, the fifth oil pressure relief valve, and the seventh oil pressure relief valve in the case where the transition of the rear-wheel regenerative braking force is completed, and then operate the motor for a drive operation to simultaneously generate pressures of the four wheels as much as a braking force desired by the driver.

In the present disclosure, the control unit may detect a regenerative braking amount through the first pressure sensor provided adjacent to the front wheels, and operate the motor for a drive operation on the basis of a result of the detection.

A method of performing rear-wheel regenerative braking control of an ESC integrated regenerative braking system in a state in which a vehicle is in a regenerative braking coordinated control mode according to another aspect of the present disclosure includes: closing, by a control unit, a seventh oil pressure relief valve in a case where a rear-wheel regenerative braking force occurs, and opening a first oil pressure relief valve and a third oil pressure relief valve; and performing, by the control unit, front-wheel pressure control on a motor according to a pressure desired by a driver and caused by a brake pedal.

In the present disclosure, the method may further include: after the performing of the front-wheel pressure control on the motor, closing, by the control unit, the seventh oil pressure relief valve and a fifth oil pressure relief valve to maintain a front-wheel oil pressure in a case where transition of the rear-wheel regenerative braking force occurs, and closing a second oil pressure relief valve; and performing, by the control unit, reverse pressure control on the motor as much as a variation in the rear-wheel regenerative braking force, and linearly generating required pressures of rear wheels.

In the present disclosure, the method may further include: after the linearly generating of the required pressures of the rear wheels, in a case where the transition of the rear-wheel regenerative braking force is completed, closing, by the control unit, a sixth oil pressure relief valve, and opening the second oil pressure relief valve, the fifth oil pressure relief valve and the seventh oil pressure relief valve; and operating, by the control unit, the motor for a drive operation to simultaneously generate pressures of four wheels as much as a braking force desired by the driver.

According to the present disclosure, at the time of regenerative braking coordinated control in an ESC integrated regenerative braking system, linear oil pressure control on rear wheels is performed using a motor having an excellent oil pressure linear control characteristic, and thereby regenerative braking coordinated control performance can be implemented without development or addition of a separate valve for the rear-wheel regenerative braking, and noise caused by valve control can be improved.

Meanwhile, the effects of the present disclosure are not limited to the above-mentioned effects, and may include various effects within a range apparent to those skilled in the art from the contents to be described below.

DETAILED DESCRIPTION OF THE ILLUSTRATED EMBODIMENTS

Figure 1:
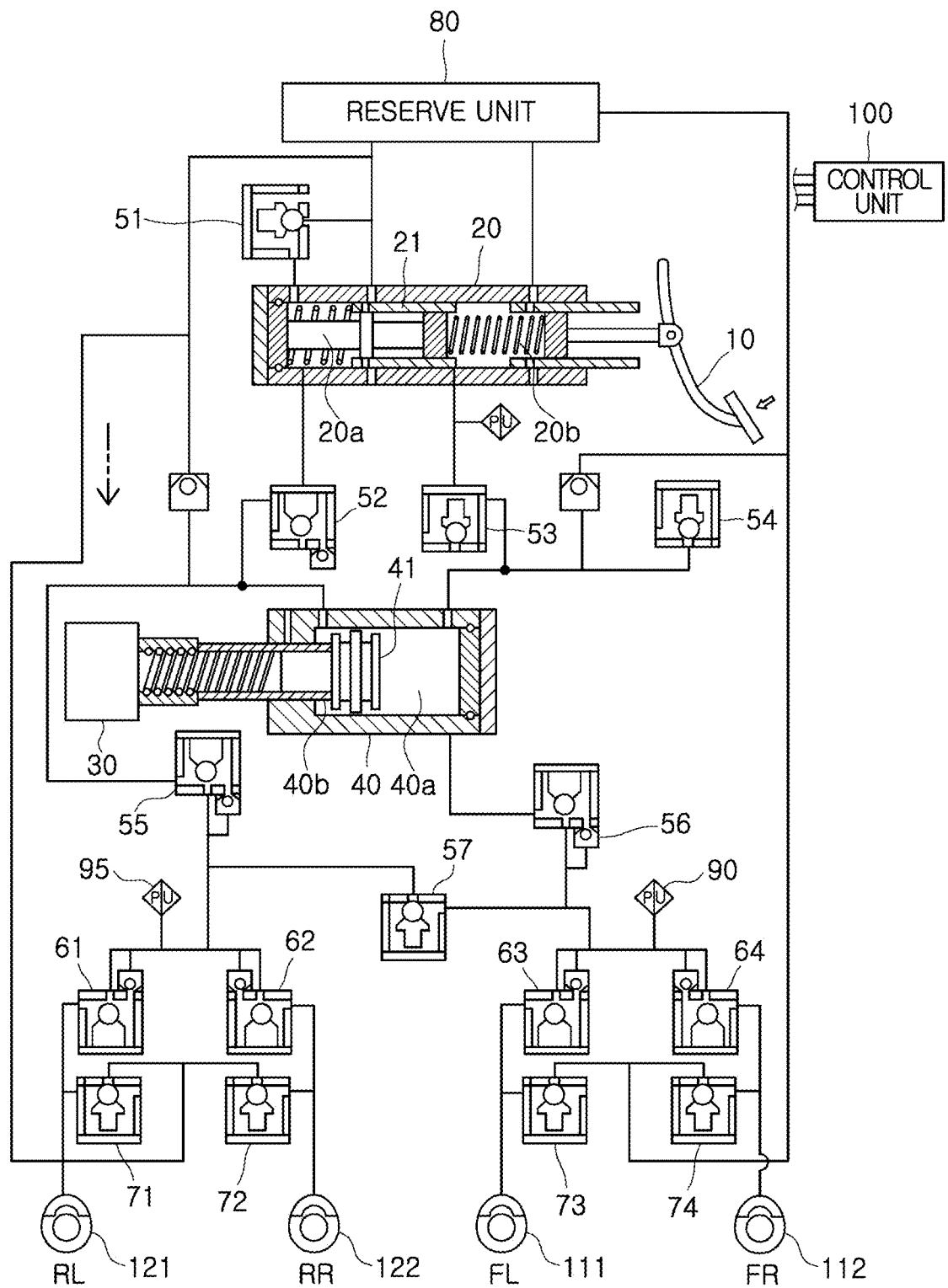
FIG. 1 is a diagram schematically illustrating an ESC integrated regenerative braking system according to an embodiment of the present disclosure.

The advantages and characteristics of the present disclosure and a method for achieving the advantages and characteristics will be clarified through the following embodiments which will be described in detail with reference to the accompanying drawings. However, it should understood that the present disclosure is not limited to the following embodiments, can be embodied in various different forms, and includes all modifications, equivalents or substitutes which are included in the scope and technical range of the present disclosure. The following embodiments are provided to complete the disclosure of the present disclosure, such that the scope of the present disclosure can be fully understood by those skilled in the art to which the present disclosure pertains. Moreover, detailed descriptions related to publicly known functions or configurations will be ruled out in order not to unnecessarily obscure subject matters of the present disclosure.

The terms used in this application are only used to describe a specific embodiment, and not intended to limit the present disclosure. The terms of a singular form may include plural forms unless referred to the contrary. In this application, it should be understood that the meaning of "include" or "have" specifies a property, a number, a step, a process, an element, a component, or combinations thereof, but does not exclude in advance one or more other properties, numbers, steps, processes, elements, components, or combinations thereof. The terms such as first and second may be used to describe various elements, but the elements should not be limited by the terms. The terms are used only to distinguish one element from another element.

Hereinafter, an apparatus and method for performing rear-wheel regenerative braking control in an ESC integrated regenerative braking system according to an embodiment of the present disclosure will be described below with reference to the accompanying drawings. Thicknesses of lines or sizes of components illustrated in the drawings in the process may be exaggeratedly illustrated for clarity and convenience of description.

Further, terms, as will be mentioned below, are terms defined in consideration of their functions in the present disclosure, which may be varied according to the intention or practice of a user or an operator. Therefore, the terms should be defined based on the contents of this specification.

Further, implementations described herein may be implemented in, for example, a method or a process, a device, a software program, a data stream, or a signal. Even if implementation of features is only discussed in the context of a single form of implementation (e.g., discussed only as a method), the implementation of features discussed may also be implemented in other forms (e.g., a device or a program). Devices may be implemented in, for example, appropriate hardware, software, and firmware. Methods may be implemented in a device such as a processor, which generally refers to processing devices, including, for example, a computer, a microprocessor, an integrated circuit, or a programmable logic device. Processors also include communication devices, such as computers, cell phones, portable/personal digital assistants ("PDAs"), and other devices that facilitate communication of information between end-users.

Figure 2:
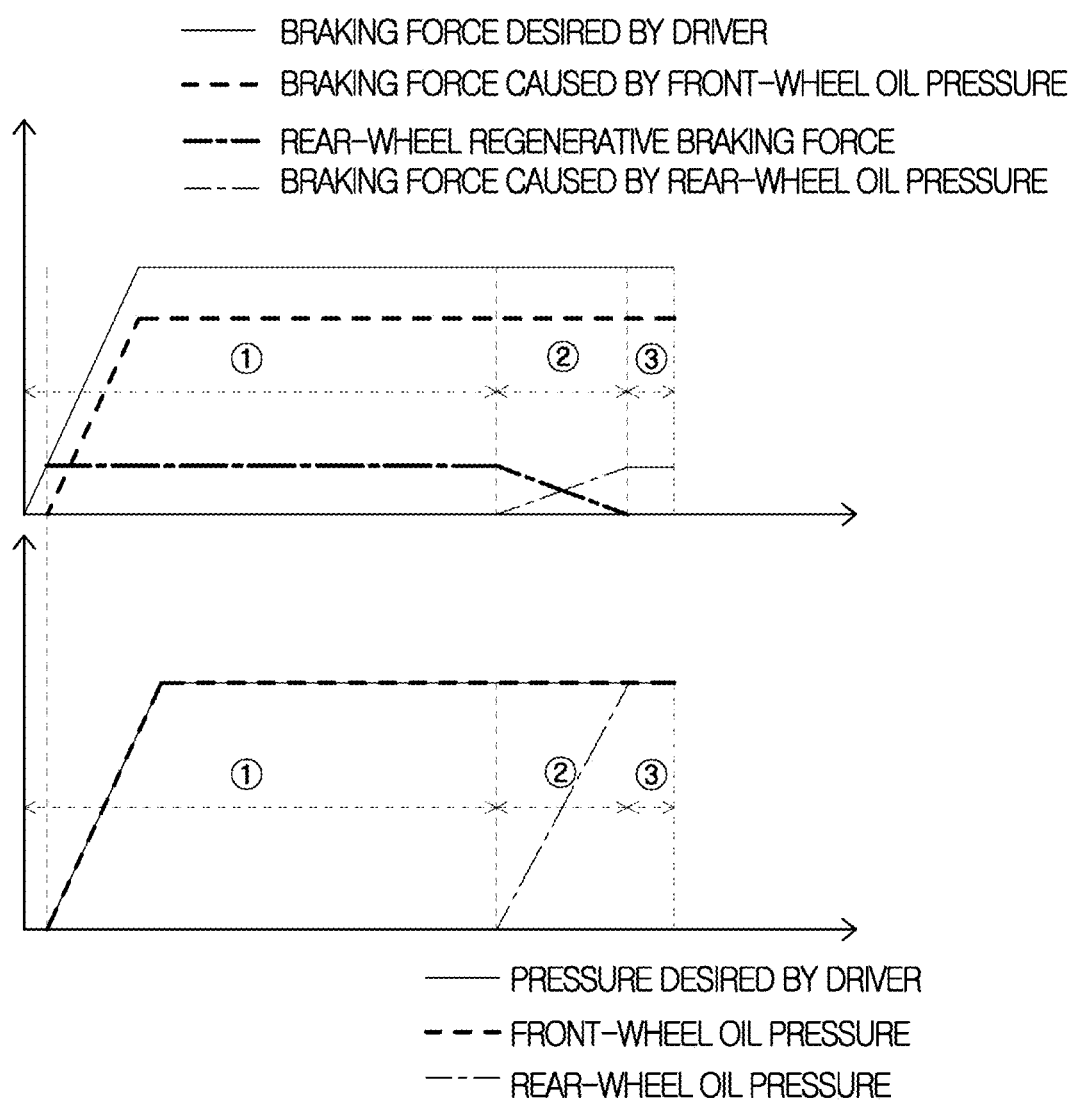
FIG. 2 is a graph illustrating rear-wheel regenerative braking at the time of regenerative braking coordinated control according to an embodiment of the present disclosure.

FIG. 1 is a diagram schematically illustrating an ESC integrated regenerative braking system according to an embodiment of the present disclosure, and FIG. 2 is a graph illustrating rear-wheel regenerative braking during regenerative braking coordinated control according to an embodiment of the present disclosure.

Referring to FIG. 1, an ESC integrated regenerative braking system according to an embodiment of the present disclosure includes a reserve unit 80, a pedal cylinder unit 20, a motor 30, a master cylinder unit 40, wheel cylinders 111, 112, 121, and 122, oil pressure relief valves 51, 52, 53, 54, 55, 56, and 57, and a control unit 100.

The reserve unit 80 is coupled to an upper portion of the pedal cylinder unit 20, and stores oil.

The pedal cylinder unit 20 generates an oil pressure as a brake pedal 10 is pressed.

The pedal cylinder unit 20 includes a pedal cylinder 22 and a pedal simulator 21, and may form two chambers. As one example, the pedal cylinder unit 20 may include a first chamber 20a and a second chamber 20b. If a driver applies a pedal force to the brake pedal 10, an oil pressure is generated by the pedal cylinder 22, the generated oil pressure is supplied to a piston of the pedal simulator 21, an elastic body of the pedal simulator 21 is pressed, and pedal feel of the driver is implemented by a reaction force of the pressed elastic body.

The motor 30 is operated by an electric signal that is output in response to displacement of the brake pedal 10. The control unit 100 may receive a rotation detection signal of the brake pedal 10 to control driving of the motor 30.

The master cylinder unit 40 is driven by the motor 30, controlled by the control unit 100, to generate an oil pressure and supplies the oil pressure to the wheel cylinders 111, 112, 121, and 122 that perform braking of wheels RR, RL, FR, and FL. Here, the control unit 100 may be an electronic control unit (ECU) that is a typical control unit of a vehicle. In the case where a driver steps on the brake pedal 10, a stroke sensor (not illustrated) detects a stroke of the brake pedal 10, and transmits the detection result to the control unit 100, and the control unit 100 controls the motor 30 on the basis of the stroke of the brake pedal 10 which is detected by the stroke sensor, thereby controlling the oil pressure generated by the master cylinder unit 40. The motor 30 is operated under the control of the control unit 100 in order to generate a braking oil pressure on the basis of signals that are output from a pedal stroke sensor (not illustrated) and a pedal cylinder pressure sensor as the brake pedal 10 is pressed.

The master cylinder unit 40 may include a master piston 41, and form two chambers. As one example, the master cylinder unit 40 may include a third chamber 40a and a fourth chamber 40b.

The wheel cylinders 111, 112, 121, and 122 include a first wheel cylinder 111 that brakes a front left wheel of a vehicle, a second wheel cylinder 112 that brakes a front right wheel of the vehicle, a third wheel cylinder 121 that brakes a rear left wheel of the vehicle, and a fourth wheel cylinder 122 that brakes a rear right wheel of the vehicle.

Inlet valves 61, 62, 63, and 64 are provided for controlling brake oil supplied to the wheel cylinders 111, 112, 121, and 122, and outlet valves 71, 72, 73, and 74 for controlling brake oil discharged from the wheel cylinders 111, 112, 121, and 122 are provided on oil pressure channels between the wheel cylinders 111, 112, 121, and 122 and the reserve unit 80.

The oil pressure relief valves 51, 52, 53, 54, 55, 56, and 57 are provided on the oil pressure channels, and are opened or closed under the control of the control unit. The oil pressure relief valves 51, 52, 53, 54, 55, 56, and 57 may include first to seventh oil pressure relief valves.

The first oil pressure relief valve 51 is provided on an oil pressure channel that connects between the reserve unit 80 and the first chamber 20a of the pedal cylinder unit 20, and is opened or closed to adjust an oil pressure under the control of the control unit 100. The second oil pressure relief valve 52 is provided on an oil pressure channel that connects between the first chamber 20a of the pedal cylinder unit 20 and the third chamber 40a of the master cylinder unit 40, and is opened or closed to adjust an oil pressure under the control of the control unit 100. The third oil pressure relief valve 53 is provided on an oil pressure channel that connects between the second chamber 20b of the pedal cylinder unit 20 and the fourth chamber 40b of the master cylinder unit 40, and is opened or closed to adjust an oil pressure under the control of the control unit 100. The fourth oil pressure relief valve 54 is provided on an oil pressure channel that connects between the reserve unit 80 and the fourth chamber 40b of the master cylinder unit 40, and is opened or closed to adjust an oil pressure under the control of the control unit 100. The fifth oil pressure relief valve 55 is provided on an oil pressure channel that connects between the third chamber 40a of the master cylinder unit 40 and the wheel cylinders, and is opened or closed to adjust an oil pressure under the control of the control unit 100. The sixth oil pressure relief valve 56 is provided on an oil pressure channel that connects between the fourth chamber 40b of the master cylinder unit 40 and the wheel cylinders, and is opened or closed to adjust an oil pressure under the control of the control unit 100.

The seventh oil pressure relief valve 57 is provided on an oil pressure channel which connects an oil pressure channel that connects between the fifth oil pressure relief valve 55 and the wheel cylinders 121 and 122, and an oil pressure channel that connects between the sixth oil pressure relief valve 56 and the wheel cylinders 111 and 112, and is opened or closed to adjust an oil pressure under the control of the control unit 100. Here, the oil pressure channel that connects between the fifth oil pressure relief valve 55 and the wheel cylinders 121 and 122 is connected to the third chamber 40a of the master cylinder unit 40, and guides an oil pressure to the third and fourth wheel cylinders 121 and 122 that are mounted on the two rear wheels, respectively. Further, a second pressure sensor 95 for measuring an oil pressure may be provided on the oil pressure channel that connects between the fifth oil pressure relief valve 55 and the wheel cylinders 121 and 122. The oil pressure channel that connects between the sixth oil pressure relief valve 56 and the wheel cylinders 111 and 112 is connected to the fourth chamber 40b of the master cylinder unit 40, and guides an oil pressure to the first and second wheel cylinders 111 and 112 that are mounted on the two front wheels, respectively. Further, a first pressure sensor 90 for measuring an oil pressure may be provided on the oil pressure channel that connects between the sixth oil pressure relief valve 56 and the wheel cylinders.

The first to seventh oil pressure relief valves 51, 52, 53, 54, 55, 56, and 57 may be normally operated valves, and may be formed as solenoid valves controlled by the control unit 100. In this case, the fourth oil pressure relief valve 54 can be omitted for cost reduction. Further, the seventh oil pressure relief valve 57 is a line split valve, and can set a spring force by which a pressure above a constant pressure can be maintained in an off state.

Generally referring to a structure of the ESC integrated regenerative braking system configured as described above, if a driver applies a pedal force to the brake pedal 10, an oil pressure is generated by the pedal cylinder unit 20, the generated oil pressure is supplied to the piston of the pedal simulator 21, the elastic body of the pedal simulator 21 is pressed, and pedal feel of the driver is implemented by a reaction force of the pressed elastic body. The motor 30 is operated under the control of the control unit 100 in order to generate a braking oil pressure on the basis of signals that are output from the pedal stroke sensor (not illustrated) and the pedal cylinder pressure sensor as the brake pedal 10 is pressed, and the master cylinder unit 40 generates a braking oil pressure through the master piston 41 that is moved forward and backward by the motor 30.

Hereinafter, a process of controlling the motor during rear-wheel regenerative braking in the ESC integrated regenerative braking system according to the present embodiment on the basis of the above-mentioned structure of the ESC integrated regenerative braking system will be described with reference to FIGS. 2 and 3.

If rear-wheel regenerative braking occurs at the time of regenerative braking coordinated control in the ESC integrated regenerative braking system, a braking force illustrated in FIG. 2 occurs. Referring to FIG. 2, a section ① refers to a rear-wheel full regenerative braking low pressure operation section at the time of the regenerative braking coordinated control, a section ② refers to a rear-wheel regenerative braking transition section at the time of the regenerative braking coordinated control, and a section ③ refers to a rear-wheel regenerative braking completion section at the time of the regenerative braking coordinated control.

Hereinafter, an operation of the ESC integrated regenerative braking system in each section illustrated in FIG. 2 will be described.

First, the rear-wheel full regenerative braking low pressure operation section at the time of the regenerative braking coordinated control will be described.

In this case, to prevent an oil pressure from occurring at the rear wheels because the rear-wheel full regenerative braking low pressure operation section is during the rear-wheel full regenerative braking, the control unit 100 closes the seventh oil pressure relief valve 57, and opens only the first oil pressure relief valve 51 and the third oil pressure relief valve 53.

Afterwards, the control unit 100 rotates the motor 30 forward or backward to increase or decrease pressures of the front wheels according to a braking force desired by a driver. That is, if the motor 30 is rotated forward or backward, a rotating force of the motor 30 is transmitted to the master cylinder unit 40, and the master cylinder unit 40 generates a liquid pressure in the third chamber 40a while the master piston 41 is moved forward or backward. The liquid pressure discharged from the master cylinder unit 40 is transmitted to the first and second wheel cylinders 111 and 112 provided on the front wheels, and generates a braking force. The control unit 100 detects the liquid pressure braking force transmitted to the front wheels from the master cylinder unit 40. In this case, the control unit 100 receives a magnitude of a regenerative braking amount through the first pressure sensor 90 provided adjacent to the front wheels, calculates a magnitude of a friction braking amount according to a difference between a braking amount desired by a driver and the regenerative braking amount, and rotates the motor 30 forward or backward to increase or decrease the pressures of the front wheels. The braking force desired by the driver may be equal to the sum of a front-wheel oil pressure braking force, a rear-wheel regenerative braking force, and a rear-wheel oil pressure braking force.

Next, an operation of the rear-wheel regenerative braking transition section at the time of the regenerative braking coordinated control will be described. Since a rear-wheel regenerative braking force is reduced in the rear-wheel regenerative braking transition section, the control unit 100 maintains the seventh oil pressure relief valve 57 in a close state, and closes the fifth oil pressure relief valve 55 to maintain a front-wheel oil pressure as it is. Further, the control unit 100 closes the second oil pressure relief valve 52, performs reverse (2-stage operation) pressure control on the motor 30 as much as a variation in the rear-wheel regenerative braking force, and linearly generates a required pressure of the rear wheels. In this case, the control unit 100 may receive the magnitude of the regenerative braking amount through the second pressure sensor 95 provided adjacent to the rear wheels, and calculate a difference between the regenerative braking amount and the rear-wheel regenerative braking force. If the second pressure sensor 95 does not exist, the control unit 100 may change a pressure command into a displacement command from a rear-wheel required liquid amount to pressure table rather than pressure control, and generate a required pressure by means of displacement control. To be specific, if the motor 30 is driven, a rotating force of the motor 30 is transmitted to the master cylinder unit 40, and the master cylinder unit 40 generates a liquid pressure in the fourth chamber 40b while the master piston 41 is moved backward. The liquid pressure discharged from the master cylinder unit 40 is transmitted to the third and fourth wheel cylinders 121 and 122 provided on the rear wheels, and generates a braking force. The control unit 100 can detect the liquid pressure braking force, which is transmitted from the master cylinder unit 40 to the third and fourth wheel cylinders 121 and 122, through the second pressure sensor 95.

Finally, an operation of the rear-wheel regenerative braking completion section at the time of the regenerative braking coordinated control will be described. If the rear-wheel regenerative braking is completed, a rear-wheel oil pressure and a front-wheel oil pressure become equal to each other, and thus the control unit 100 closes the sixth oil pressure relief valve 56, and opens the second, fifth and seventh oil pressure relief valves 52, 55, and 57. Afterward, the control unit 100 operates the motor 30 for a drive operation (a 1-stage operation), and simultaneously generates pressures of the four wheels as much as a braking force desired by a driver. In this case, the control unit 100 receives the magnitude of the regenerative braking amount through the first pressure sensor 90 provided adjacent to the front wheels, calculates the magnitude of a friction braking amount according to a difference between a braking force desired by the driver and the regenerative braking amount, and operates the motor 30 for the drive operation to simultaneously generate the pressures of the four wheels.

To be specific, if the motor 30 is driven, a rotating force of the motor 30 is transmitted to the master cylinder unit 40, and the master cylinder unit 40 generates a liquid pressure in the third chamber 40a while the master piston 41 is moved forward. The liquid pressure discharged from the master cylinder unit 40 is transmitted to the wheel cylinders 111, 112, 121, and 122 provided on the front and rear wheels, and generates a braking force. The control unit 100 can detect the liquid pressure braking force, which is transmitted from the master cylinder unit 40 to the first and second wheel cylinders 111 and 112, through the first pressure sensor 90.

Figure 3:
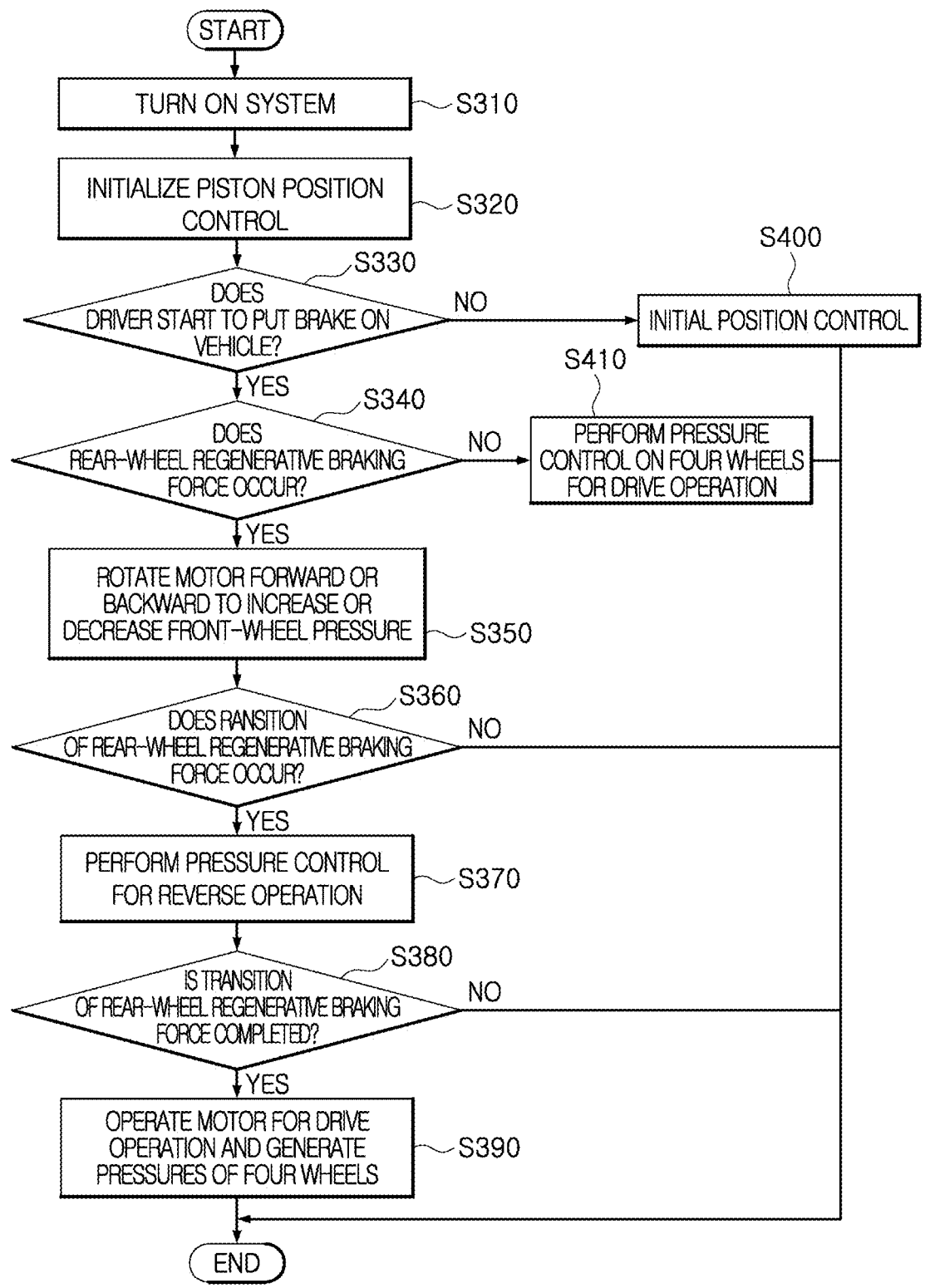
FIG. 3 is a flow chart illustrating a method for performing rear-wheel regenerative braking control in the ESC integrated regenerative braking system according to the embodiment of the present disclosure.

FIG. 3 is a flow chart illustrating a method of performing rear-wheel regenerative braking control in an ESC integrated regenerative braking system according to an embodiment of the present disclosure.

Referring to FIG. 3, if a system is turned on (S310), the control unit 100 initializes piston position control (S320). In this case, the control unit 100 opens the first oil pressure relief valve 51 and the seventh oil pressure relief valve 57, and closes the third oil pressure relief valve 53.

After step S320 is performed, if a driver starts to put a brake on a vehicle (S330), the control unit 100 determines whether or not a rear-wheel regenerative braking force occurs at the vehicle (S340). That is, if a driver starts to put a brake on a vehicle, the control unit 100 can detect a braking force, desired by the driver, through information such as a pressure of the brake pedal 10 on which the driver steps.

As a result of the determination of step S340, if it is determined that the rear-wheel regenerative braking force occurs, the control unit 100 rotates the motor 30 forward or backward to increase or decrease a front-wheel pressure (S350).

If step S350 is performed, the control unit 100 determines whether or not transition of the rear-wheel regenerative braking force occurs (S360). In this case, the control unit 100 can receive a magnitude of a regenerative braking amount through the second pressure sensor 95 provided adjacent to the rear wheels, and determine whether or not the transition of the rear-wheel regenerative braking force occurs.

As a result of the determination of step S360, if the transition of the rear-wheel regenerative braking force occurs, the control unit 100 performs reverse pressure control on the motor 30 as much as a variation in the rear-wheel regenerative braking force, and linearly generates required pressures of the rear wheels (S370). In this case, the control unit 100 maintains the seventh oil pressure relief valve 57 in a close state so as to prevent an oil pressure from occurring at the rear wheels, closes the fifth oil pressure relief valve 55 to maintain a front-wheel oil pressure as it is, and then performs the reverse pressure control on the motor 30.

If step S370 is performed, the control unit 100 determines whether or not the transition of the rear-wheel regenerative braking force is completed (S380).

As a result of the determination of step S380, if the transition of the rear-wheel regenerative braking force is completed, the control unit 100 operates the motor 30 for a drive operation, and simultaneously generates pressures of the four wheels as much as a braking force desired by a driver (S390). That is, if the transition of the rear-wheel regenerative braking force is completed and a front-wheel oil pressure and a rear-wheel oil pressure become equal to each other, the control unit 100 closes the sixth oil pressure relief valve 56, opens the second, fifth and seventh oil pressure relief valves 52, 55, and 57, and then operates the motor 30 for the drive operation to simultaneously generate the pressures of the four wheels as much as the braking force desired by the driver.

As a result of the determination of step S330, if the driver does not start to put a brake on the vehicle, the control unit 100 performs initial position control (S400).

As a result of the determination of step S340, if the rear-wheel regenerative braking force does not occur, the control unit 100 performs pressure control on the four wheels for the drive operation (S410).

As described above, the apparatus and method for performing rear-wheel regenerative braking control of the ESC integrated regenerative braking system according to an embodiment of the present disclosure performs linear oil pressure control on the rear wheels using a motor having an excellent oil pressure linear control characteristic at the time of the regenerative braking coordinated control, and thereby regenerative braking coordinated control performance can be implemented without development or addition of a separate valve for the rear-wheel regenerative braking, and noise caused by valve control can be improved.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a rear-wheel regenerative braking of an electronic stability control (ESC) integrated regenerative braking system of a vehicle, comprising:
  a pedal cylinder unit connected to a reserve unit storing oil and configured to generate an oil pressure when a brake pedal is pressed;
  a motor configured to be driven by an electric signal generated in response to displacement of the brake pedal;
  a master cylinder unit connected to the pedal cylinder unit and configured to generate a braking oil pressure through a master piston that is moved forward or backward by the driving of the motor;
  a control unit configured to:
    in a state in which the vehicle is in a regenerative braking coordinated control mode, perform front-wheel pressure control on the motor according to a pressure desired by a driver based on the brake pedal in a case where a rear-wheel regenerative braking force occurs;

perform reverse pressure control on the motor as much as a variation in the rear-wheel regenerative braking force in a case where reduction of the rear-wheel regenerative braking force occurs; and perform drive pressure control on the motor in a case where the reduction of the rear-wheel regenerative braking force is completed; and a plurality of oil pressure relief valves provided on a plurality of oil pressure channels extending from the reserve unit to a plurality of wheel cylinders configured to brake a plurality of wheels, wherein the control unit is configured to control opening and closing of the plurality of oil pressure relief valves.

2. The apparatus according to claim 1, wherein the oil pressure relief valves include:

a first oil pressure relief valve that adjusts an oil pressure of an oil pressure channel connecting between the reserve unit and a first chamber of the pedal cylinder unit;

a second oil pressure relief valve that adjusts an oil pressure of an oil pressure channel connecting between the first chamber of the pedal cylinder unit and a third chamber of the master cylinder unit;

a third oil pressure relief valve that adjusts an oil pressure of an oil pressure channel connecting between a second chamber of the pedal cylinder unit and a fourth chamber of the master cylinder unit;

a fourth oil pressure relief valve that adjusts an oil pressure of an oil pressure channel connecting between the reserve unit and the fourth chamber of the master cylinder unit;

a fifth oil pressure relief valve that adjusts an oil pressure of an oil pressure channel connecting between the third chamber of the master cylinder unit and the wheel cylinders;

a sixth oil pressure relief valve that adjusts an oil pressure of an oil pressure channel connecting between the fourth chamber of the master cylinder unit and the wheel cylinders; and a seventh oil pressure relief valve that adjusts an oil pressure of an oil pressure channel connecting between the fifth oil pressure relief valve and the sixth oil pressure relief valve.

3. The apparatus according to claim 2, wherein, in the case where the rear-wheel regenerative braking force occurs, the control unit closes the seventh oil pressure relief valve, opens the first oil pressure relief valve and the third oil pressure relief valve, and then rotates the motor forward or backward to increase or decrease pressures of the front wheels.

4. The apparatus according to claim 3, wherein the control unit detects a regenerative braking amount through a first pressure sensor provided adjacent to the front wheels, and performs front-wheel pressure control on the motor on the basis of a result of the detection.

5. The apparatus according to claim 2, wherein, in the case where the reduction of the rear-wheel regenerative braking force occurs, the control unit closes the seventh oil pressure relief valve and the fifth oil pressure relief valve to maintain a front-wheel oil pressure, closes the second oil pressure relief valve, performs the reverse pressure control on the motor as much as the variation in the rear-wheel regenerative braking force, and linearly generates a rear-wheel pressure.

6. The apparatus according to claim 5, wherein the control unit detects a regenerative braking amount through a second pressure sensor provided adjacent to the rear wheels, and performs the reverse pressure control on the motor on the basis of a result of the detection.

7. The apparatus according to claim 2, wherein, in the case where the reduction of the rear-wheel regenerative braking force is completed, the control unit closes the sixth oil pressure relief valve, opens the second oil pressure relief valve, the fifth oil pressure relief valve, and the seventh oil pressure relief valve, and then operates the motor for a drive operation to simultaneously generate pressures of the plurality of wheels as much as a braking force desired by the driver.

8. The apparatus according to claim 7, wherein the control unit detects a regenerative braking amount through the first pressure sensor provided adjacent to the front wheels, and operates the motor for the drive operation on the basis of a result of the detection.

9. A method of operating the apparatus of claim 2, the method comprising:

in a case where the rear-wheel regenerative braking force occurs, closing the seventh oil pressure relief valve, and opening the first oil pressure relief valve and the third oil pressure relief valve; and performing the front-wheel pressure control on the motor.

10. The method according to claim 9, further comprising, after the performing of the front-wheel pressure control on the motor:

in a case where the reduction of the rear-wheel regenerative braking force occurs, closing the seventh oil pressure relief valve and the fifth oil pressure relief valve to maintain the front-wheel oil pressure, and closing the second oil pressure relief valve; and performing the reverse pressure control on the motor.

11. The method according to claim 10, further comprising, after the linearly generating of the required pressures of the rear wheels:

in a case where the reduction of the rear-wheel regenerative braking force is completed, closing, by the control unit, the sixth oil pressure relief valve, and opening the second oil pressure relief valve, the fifth oil pressure relief valve, and the seventh oil pressure relief valve; and operating, by the control unit, the motor for a drive operation to simultaneously generate pressures of the four wheels as much as a braking force desired by the driver.

* * * * *